Feb. 22, 1972   E. KOBERSTEIN ET AL   3,644,468
METHOD OF REACTING HCN WITH UNSATURATED COMPOUND
WITH A PYRROLIDONE SOLVENT
Filed Nov. 26, 1968
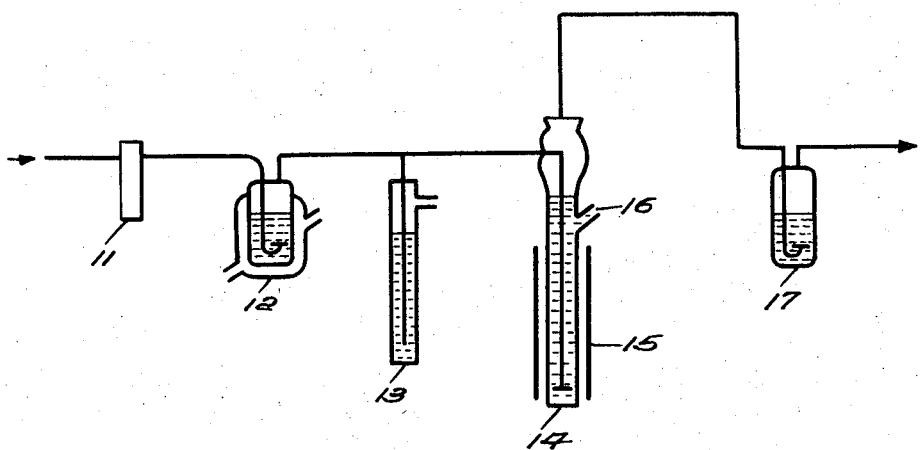
INVENTORS
EDGAR KOBERSTEIN,
WOLFGANG NISCHK,
BY Cushman, Darby & Cushman
ATTORNEYS 3,644,468
METHOD OF REACTING HCN WITH UNSATURATED COMPOUND WITH A PYRROLIDONE SOLVENT
Edgar Koberstein, Alzenau, and Wolfgang Nischk, Wesseling, Germany, assignors to Deutsche Gold- und Silber-Scheideanstalt vormals Roessler, Frankfurt am Main, Germany
Continuation-in-part of application Ser. No. 613,941, Feb. 3, 1967. This application Nov. 26, 1968, Ser. No. 778,939
Claims priority, application Germany, Feb. 9, 1966, D 49,322
Int. Cl. C07c *121/04, 121/20, 121/40*
U.S. Cl. 260—465 D                    13 claims

ABSTRACT OF THE DISCLOSURE

Production of nitrile group containing organic compounds is accomplished by addition of hydrogen cyanide across an unsaturated carbon to carbon double bond of an organic compound in the presence of cyanide ions and in the presence of pyrrolidone or a substituted pyrrolidone, preferably methyl pyrrolidone. The pyrrolidone compound is employed in a molar proportion of at least 0.3:1 with reference to the unsaturated compound.

---

The present application is a continuation-in-part of application Ser. No. 613,941, filed Feb. 3, 1967, and now abandoned.

The present invention relates to a process for the addition of hydrogen cyanide to olefinic compounds.

It is known (see Liebigs Analen der Chemie, vol. 572, 1951, pages 23–82, and Houben-Weyl, 4th ed., vol. 8, Oxygen compounds III, 1952, page 269) that the addition of hydrogen cyanide to carbon double bonds is greatly influenced by the molecular grouping around this unsaturated bond. For instance, while the addition of hydrogen cyanide on unsubstituted, activated olefinic bonds is accomplished rather easily, the take up of the hydrogen cyanide is rendered more difficult when the hydrogen atoms on the carbon atoms adjacent to the double bond are replaced by aliphatic, alicyclic and aromatic as well as aralkyl or alkaryl radicals. Compounds which contain a cyano, keto, nitro, carbalkoxy group or other carboxyl derivative, such as, a carbamoyl group in conjugation with the olefinic double bond are to be considered as compounds containing activated olefinic bonds.

Processes are known (German published application 1,068,688, German Pat. 808,835, and Houben-Weyl, 4th ed., vol. 8, Oxygen compounds III, 1952, p. 271) according to which the addition of hydrogen cyanide is effected on olefinic bonds of this type in the presence of a catalyst and under pressure. However, such processes require a rather complicated conduct of the reaction.

It has also been proposed to add hydrogen cyanide across the double bond of a carboxylic acid ester of an alpha, beta unsaturated alcohol, e.g. vinyl acetate, in the presence of an alkaline catalyst, preferably with the use of an aldehyde or ketone as a promoter, Ellingboe Pat. 2,397,341, Mar. 26, 1946. Likewise, it has been suggested to add hydrogen cyanide across the double bond of unsaturated hydrocarbons, ketones, aldehydes, acids and esters in the presence of N,N-dimethyl formamide or N,N-dimethyl acetamide under alkaline conditions, Heider Pat. 2,698,337, Dec. 28, 1954, and the corresponding Monsanto British Pat. 730,209, May 18, 1955. The substituted formamide or acetamide forms a complex with the hydrogen cyanide.

According to the invention it has been found that the addition of hydrogen cyanide across carbon to carbon double bonds, which preferably are activated as indicated supra, can be carried out in the presence of compounds forming cyanide ions with good yields, if carried out at normal (atmospheric) pressure in the presence of pyrrolidone-2 or a substituted pyrrolidone-2, such as methyl pyrrolidone-2 and other alkyl substituted pyrrolidones, e.g. N-methyl pyrrolidone-2, 3-methyl pyrrolidone-2, 1,5-dimethyl pyrrolidone-2, 3,3-dimethyl pyrrolidone-2, N-butyl pyrrolidone-2, 3-butyl pyrrolidone-2. As examples of compounds with carbon to carbon double bonds suitable as starting material are unsaturated straight or branch chained aliphatic, alicyclic or heterocyclic compounds or unsaturated araliphatic compounds which are activated in conjunction with the double bond as indicated above and, especially, those wherein other hydrogen atoms attached to carbon atoms adjacent to the double bond are replaced by aliphatic, alicyclic, heterocyclic, aryl or aralkyl radicals.

Specific examples of suitable unsaturated compounds include acrylic, methacrylic, crotonic acid alkyl esters, e.g. ethyl crotonate, methyl methacrylate, butyl methacrylate, methyl acrylate, ethyl acrylate and 2-ethylhexyl acrylate, maleic and fumaric acid alkyl esters, e.g., diethyl fumarate, dimethyl maleate, diethyl maleate and dibutyl maleate, cinnamic acid alkyl esters, e.g. methyl cinnamate and ethyl cinnamate, nitriles, e.g. acrylonitrile, methacrylonitrile, 1-cyanobutadiene-1,3 and crotononitrile.

As indicated, the reaction is carried out in the presence of pyrrolidone-2 or a substituted pyrrolidone-2. The pyrrolidone compound is preferably employed in a molar ratio of at least 0.3:1 with reference to the unsaturated reactant. An upper limit is practically unnecessary, but expediently molar ratios exceeding 3:1 are not used for economic reasons.

The reaction temperature is not critical and normally is between about 20 and 200° C. Preferably, the reaction is carried out at temperatures between 40 and 130° C. at normal pressure. Obviously, the reaction in the presence of the pyrrolidone compound can also be carried out at a somewhat increased pressure, but one of the advantages of the process according to the invention is the fact that it uniquely can be carried out at normal pressures while providing technically interesting yields.

All cyanide ion yielding substances can be employed as the catalyst but preferably alkali metal cyanides, e.g. sodium cyanide or, more preferably, potassium cyanide are employed in a quantity of 0.1 to 10% by weight, preferably 0.5–5% by weight, based on the unsaturated reactant. Any conventional alkaline material can be used as the catalyst such as those mentioned in the art cited supra. Thus, there can be used sodium hydroxide, potassium hydroxide, quaternary ammonium hydroxides, e.g. tetraethyl ammonium hydroxide, amines, e.g. triethyl amine.

The hydrogen cyanide can be supplied in liquid or gaseous form. Expediently the process is carried out in a column and the hydrogen cyanide is supplied thereto in admixture with other gases not taking part in the reaction.

It is of advantage in the process according to the invention that it can be carried out simply and that the polymerization of the reactants, which is difficult to control when working under pressure, is avoided to a far-reaching extent.

The general applicability of the process according to the invention renders it useful in the production of many useful products. In addition to being useful as solvents they, in view of the reactive and convertible nitrile group, present useful intermediates, such as, for example, for the production of carboxylic acids by saponification of the nitrile group or groups present and therefore present substances useful in the production of polyester lacquers.

Furthermore β-cyanisobutyric acid methyl ester is a useful solvent for polyvinyl chloride, polyacrylate and other polymers. It is also a valuable intermediate for the production of N-vinyl-methylsuccinimide and N-vinyl-pyrrolidone, which are well known monomers for polymerization.

The accompanying drawing diagrammatically shows an apparatus suitable for carrying out the process according to the invention.

The process, for example, can be carried out with such apparatus by introducing a metered stream of nitrogen over a capillary flow meter 11 and over a frit into a thermostatted saturator 12 containing liquid hydrogen cyanide. Depending upon the saturation temperature employed, the nitrogen stream takes up a corresponding quantity of hydrogen cyanide and is passed over safety valve 13 and over a frit into the bottom of reaction column 14 which contains the reaction solution. The heater 15 for the reaction column 14 is regulated by a thermometer 16 which dips into the reaction solution. The non-reacted hydrogen cyanide which leaves the reaction column is absorbed in NaOH washer 17.

The process can be carried out with just as good yields with the use of liquid reactants in a stirring vessel.

The following examples will serve to illustrate the process of the invention with reference to preferred embodiments thereof.

While the present invention is directed to the use of pyrrolidone compounds as solvents, there are included the examples from the parent application in which dimethyl sulfoxide is employed as a solvent, since in each case, the same molar amount of the pyrrolidone compound can be employed.

EXAMPLE 1

99 g. (1 mol) of 3-methyl pyrrolidone-(2), 1 g. of potassium cyanide and 100 g. (1 mol) methyl methacrylate were placed in reaction column 14 of the apparatus described and heated to 100° C. Thereafter a total of 27 g. (1 mol) of hydrogen cyanide were introduced into the reaction column in a period of 4¼ hours with the aid of a nitrogen stream of 100 ml./min. The methyl methacrylate conversion was quantitative and 122.2 g. of β-cyanoisobutyric acid methyl ester with a boiling point of 93° C. at 11 torr were obtained. This corresponded to a yield of 96.2% of theory.

EXAMPLE 2

200 g. of 3-methyl pyrrolidone-(2) and 4 g. of potassium cyanide were placed in a three-necked one liter flask provided with a stirrer, reflux condenser, thermometer and a cooled dropping funnel and heated to 100° C. Thereupon a mixture of 400.5 g. (4 mol) of methyl methacrylate and 108.1 g. (4 mol) of liquid hydrogen cyanide were then slowly added over the dropping funnel cooled to —5° C. with brine in such a way that the reaction temperature did not because of the ensuing exothermic reaction rise over 120° C. The addition was completed in 1½ hours and the solution was heated for a further 5.5 hours at 120° C.

At a methyl methacrylate conversion of 86.7%, 392.8 g. of β-cyanoisobutyric acid methyl ester were obtained. This corresponded to an 89.1% yield based on methyl methacrylate converted.

EXAMPLE 3

33 ml. of dimethyl sulfoxide, 1 g. of potassium cyanide and 100.1 g. (1 mol) of methyl methacrylate were heated in the reaction column 14 of the same apparatus as used in Example 1 and heated to 100° C. Thereafter a total of 32.5 g. (1.2 mol) of hydrogen cyanide in gas form were introduced into the reaction tube over a period of 5 hours with the aid of a nitrogen stream of 100 ml./min.

94.3% of the methyl methacrylate was converted and 119.8 g. of β-cyanoisobutyric acid methyl ester were obtained. This corresponded to about 99% yield on the methyl methacrylate converted.

EXAMPLE 4

25 ml. of dimethyl sulfoxide and 1 g. of potassium cyanide were heated to 100° C. in a stirring flask as described in Example 2. A mixture of 57 g. (0.5 mol) of crotonic acid ethyl ester and 13.5 g. (0.5 mol) of hydrogen cyanide were added dropwise. After a reaction period of 6 hours, 97% of the crotonic acid ethyl ester had reacted. 63.7 g. of β-cyanobutyric acid ethyl ester with a boiling point of 110° C. at 19 torr were obtained. This corresponded to a 93.1% yield on the crotonic acid ethyl ester converted.

EXAMPLE 5

50 ml. of dimethyl sulfoxide and 1 g. of potassium cyanide were placed in a stirring flask as described in Example 2. A mixture of 33.5 g. (0.5 mol) of methacrylic acid nitrile and 13.5 g. (0.5 mol) of hydrogen cyanide were added dropwise to the solution at a temperature of 100° C. After a reaction period of 6 hours a quantitative conversion of the methacrylic acid nitrile was achieved. 45.9 g. of pyrotartaric acid (methyl succinic acid) dinitrile with a boiling point of 109° C. at 5 torr were obtained. This corresponded to a 97.7% yield.

EXAMPLE 6

50 ml. of dimethyl sulfoxide and 1 g. of potassium cyanide were placed in a stirring flask as described in Example 2. At room temperature, a mixture of 43 g. (0.5 mol) of acrylic acid methyl ester and 13.5 g. (0.5 mol) of hydrogen cyanide were added thereto dropwise. The reaction temperature during the 4 hours reaction period was maintained below 30° C. with water cooling.

At a conversion of 94.3%, 49.6 g. of β-cyanopropionic acid methyl ester were obtained. This corresponded to a 93.1% conversion based on the acrylic acid methyl ester converted.

EXAMPLE 7

50 ml. of dimethyl sulfoxide and 2 g. of potassium cyanide were placed in a stirring flask as described in Example 2. A mixture of 88 g. (0.5 mol) of cinnamic acid ethyl ester and 13.5 g. (0.5 mol) of hydrogen cyanide were added dropwise to the resulting solution at 100° C. in an hour. The reaction temperature was thereafter raised to 120° C. for 4 hours.

At a conversion of 77.2%, 76.6 g. of β-phenyl-β-cyanopropionic acid ethyl ester with a boiling point of 155–157° C. at 6.5 torr were obtained. This corresponded to a 97.6% yield on the cinnamic acid ethyl ester converted.

Under identical conditions, methyl methacrylate and hydrogen cyanide were reacted at 70 to 75° C. for 4 hours using N-methyl pyrrolidone-2, 3-methyl pyrrolidone-2 and pyrrolidone-2. The yields of methyl β-cyanoisobutyrate in the three runs is set forth below:

| | Percent |
|---|---|
| (a) in N-methyl pyrrolidone | 56 |
| (b) in 3-methyl pyrrolidone | 37 |
| (c) in pyrrolidone | 43 |

EXAMPLE 8

100 ml. of freshly distilled N-methyl pyrrolidone-2- and 2 g. of potassium cyanide were added to a container. A mixture of 53 g. acrylonitrile (1 mol) and 43 ml. of hydrogen cyanide (1.1 mol) was added dropwise during a period of 70 minutes. The reaction mixture was maintained at 80 to 90° C. during the dropwise addition and for a further 460 minutes. The conversion was 99% complete. There were recovered 75 g. (0.94 mol) of succinodinitrile with a boiling point of 139° C. at 11 torr. This corresponds to a yield of 95% based on the acrylonitrile converted.

EXAMPLE 9

50 ml. of N-methyl pyrrolidone-2 and 1 g. of potassium cyanide were added to a container. A mixture of 85 ml. of ethyl cinnamate and 20 ml. of hydrogen cyanide was added dropwise during a period of 3 hours. The reaction mixture was held at 100 to 120° C. during the dropwise addition and a further 4 hours. Thereupon, the reaction was stopped. Gas chromatography indicated a conversion of about 40% and a yield of about 75% of the ethyl ester of $\beta$-phenyl-$\beta$-cyanopropionic acid based on the converted portion of the ethyl cinnamate.

Unless otherwise indicated, all parts and percentages are by weight.

What is claimed is:

1. In a process for the production of nitrile group containing organic compounds by reacting hydrogen cyanide with an organic compound containing an olefinically unsaturated carbon to carbon double bond selected from the group consisting of alkyl esters of acrylic acid, methacrylic acid, crotonic acid, maleic acid, fumaric acid and cinnamic acid, acrylonitrile, methacrylonitrile, 1-cyanobutadiene-1,3 and crotononitrile in the presence of alkali metal cyanide to add the hydrogen cyanide to the carbon atoms of the double bond, the improvement comprising carrying out the reaction in contact with a pyrrolidone selected from the group consisting of pyrrolidone-2 and alkylpyrrolidone-2 in a molar proportion of at least 0.3:1 with reference to said organic compound.

2. A process according to claim 1 wherein the unsaturated compound is an alkyl ester of acrylic acid, methacrylic acid, cinnamic acid or crotonic acid.

3. A process according to claim 1 carried out at atmospheric pressure in contact with pyrrolidone-2 or methyl pyrrolidone-2.

4. A process according to claim 1 wherein the unsaturated compound is selected from the group consisting of methyl methacrylate, ethyl crotonate, methyl acrylate, methacrynonitrile and methyl cinnamate.

5. A process according to claim 4 wherein the pyrrolidone is pyrrolidone-2.

6. A process according to claim 4 wherein the pyrrolidone is 3-methyl pyrrolidone-2.

7. A process according to claim 4 wherein the pyrrolidone is N-methyl pyrrolidone-2.

8. A process according to claim 1 wherein the unsaturated compound is acrylonitrile, methacrylonitrile or crotononitrile.

9. A process according to claim 1 in which the reaction is carried out at a temperature between 20 and 200° C.

10. A process according to claim 9 in which the reaction is carried out at a temperature between 40 and 130° C.

11. A process according to claim 1 wherein the reaction is carried out in contact with an alkali metal cyanide in a quantity of 0.1 to 10% by weight based on the olefinically unsaturated compound.

12. A process according to claim 1 wherein the reaction is carried out in contact with potassium cyanide in a quantity of 0.5 to 5% by weight based on the olefinically unsaturated compound.

13. A process according to claim 1 wherein the pyrrolidone is employed in a molar proportion of at least 0.3:1 with reference to the unsaturated organic compound, the reaction is carried out at 20 to 200° C. and the unsaturated compound and hydrogen cyanide are reacted in equimolar amounts.

References Cited

UNITED STATES PATENTS

| | | | |
|---|---|---|---|
| 2,397,341 | 3/1946 | Ellingboe | 260—465.4 |
| 2,553,008 | 5/1951 | Sager | 260—465.3 |
| 3,133,114 | 5/1964 | Freure et al. | 260—465.8 X |

JOSEPH P. BRUST, Primary Examiner

U.S. Cl. X.R.

260—465.4, 465.8 R